(12) United States Patent
Mallary et al.

(10) Patent No.: US 9,159,344 B2
(45) Date of Patent: Oct. 13, 2015

(54) DISK DRIVE READ CIRCUIT COMPRISING AN AC COUPLED SENSE AMPLIFIER FOR AMPLIFYING A READ SIGNAL

(71) Applicant: Western Digital Technologies, Inc., Irvine, CA (US)

(72) Inventors: Michael L. Mallary, Sterling, MA (US); Yiao-Tee Hsia, Pleasanton, CA (US); William D. Huber, Hollister, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/890,131

(22) Filed: May 8, 2013

(65) Prior Publication Data
US 2014/0334038 A1 Nov. 13, 2014

(51) Int. Cl.
*G11B 5/48* (2006.01)
*G11B 5/40* (2006.01)
*G11B 20/00* (2006.01)

(52) U.S. Cl.
CPC .............. *G11B 5/4853* (2013.01); *G11B 5/40* (2013.01); *G11B 2020/0005* (2013.01); *Y10T 29/4913* (2015.01)

(58) Field of Classification Search
None
See application file for complete search history.

(56) References Cited

U.S. PATENT DOCUMENTS

| | | | |
|---|---|---|---|
| 5,065,094 A | 11/1991 | Mowry | |
| 5,548,453 A * | 8/1996 | Sasaki et al. | 360/67 |
| 5,712,747 A | 1/1998 | Voldman et al. | |
| 5,771,571 A | 6/1998 | Voldman et al. | |
| 6,351,353 B1 * | 2/2002 | Sluzewski et al. | 360/294.3 |
| 6,377,411 B1 | 4/2002 | Katsumata et al. | |
| 6,400,529 B1 | 6/2002 | Baba et al. | |
| 6,404,575 B1 | 6/2002 | Yen | |
| 6,577,476 B1 | 6/2003 | Childress et al. | |
| 6,762,896 B2 | 7/2004 | Yoshizawa et al. | |
| 7,009,820 B1 | 3/2006 | Hogg | |
| 7,050,268 B2 | 5/2006 | Kikuchi et al. | |
| 7,119,995 B2 | 10/2006 | Granstrom et al. | |
| 7,230,805 B2 | 6/2007 | Childress et al. | |
| 7,289,302 B1 | 10/2007 | Mallary | |
| 2004/0245985 A1 | 12/2004 | Mayfield et al. | |
| 2006/0132125 A1 * | 6/2006 | Withanawasam | 324/252 |
| 2008/0180854 A1 * | 7/2008 | Chang et al. | 360/264.2 |
| 2013/0033783 A1 * | 2/2013 | Gerasimov | 360/78.14 |

FOREIGN PATENT DOCUMENTS

EP 0595350 B1 4/1994

OTHER PUBLICATIONS

Peter Elenius, Lee Levine, "Comparing Flip-Chip and Wire-Bond Interconnection Technologies", Chip Scale Review, Jul./Aug. 2000, ChipScaleReview.com.
Akinobu S., Akira O., Koichi T., "A Silicon Interposer With an Integrated SrTiO3 Thin Film Decoupling Capacitor and Through-Silicon Vias", IEEE Transactions on Components and Packaging Technologies, vol. 33, No. 3, Sep. 2010.

* cited by examiner

*Primary Examiner* — Daniell L Negron (57) ABSTRACT

A disk drive read circuit is disclosed comprising a read element for generating a read signal, and a sense amplifier comprising an input terminal coupled through a first capacitor to the read element and an output terminal coupled through a second capacitor to a transmission line, wherein the sense amplifier is for amplifying the read signal.

30 Claims, 6 Drawing Sheets

DISK DRIVE READ CIRCUIT COMPRISING AN AC COUPLED SENSE AMPLIFIER FOR AMPLIFYING A READ SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

A number of heads are typically fabricated on a substrate of a wafer (e.g., an aluminum titanium carbide (ALTiC) wafer) which is then sliced to form sliders. Each slider is coupled to one of the actuator arms through a suspension that biases the slider toward the disk surface. The slider comprises an airbearing surface (ABS) wherein as the disk rotates, an airbearing is formed between the slider and the disk that counteracts the bias force of the suspension. Accordingly, the head essentially flies just above the disk surface during write/read operations. Data is typically written to the disk by modulating a write current in an inductive coil of the head to record magnetic transitions onto the disk surface in a process referred to as saturation recording. During readback, the magnetic transitions are sensed by a read element (e.g., a magnetoresistive element) of the head and the resulting read signal demodulated by a suitable read channel.

DETAILED DESCRIPTION

Figure 1A:
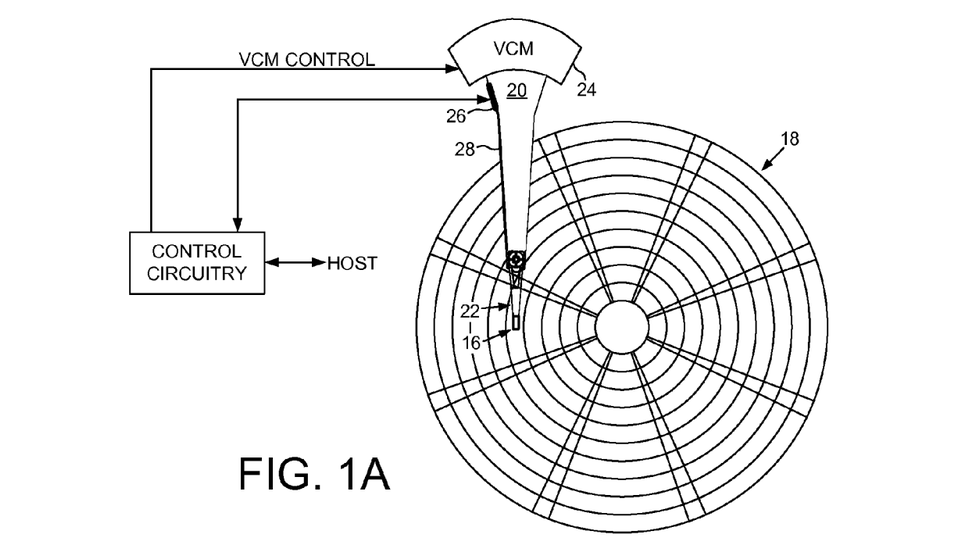
FIG. 1A shows a disk drive according to an embodiment comprising a slider actuated over a disk, and a preamplifier mounted on an actuator arm, wherein the slider comprises a read element operable to generate a read signal.
Figure 1B:
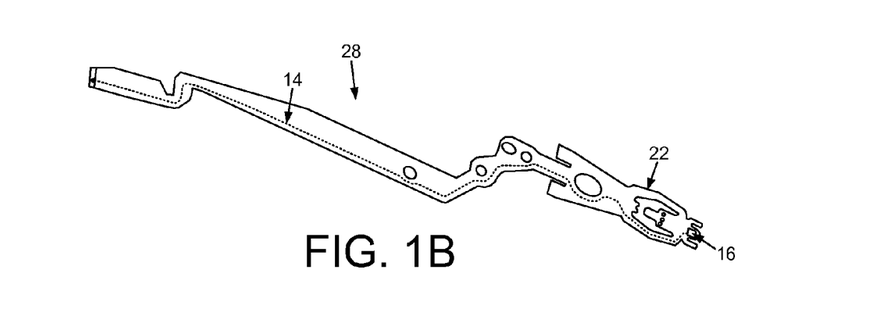
FIG. 1B shows an interconnect for connecting the slider to the preamplifier according to an embodiment.
Figure 1C:
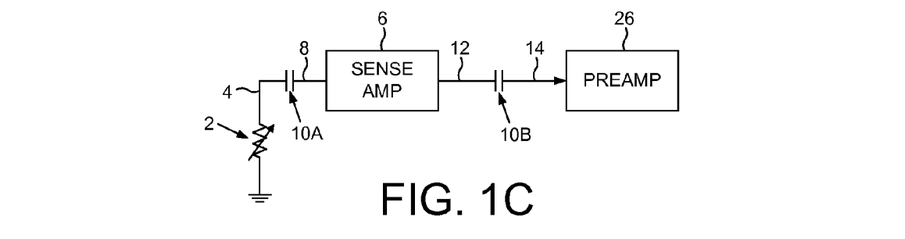
FIG. 1C shows a disk drive read circuit according to an embodiment comprising a sense amplifier having an input terminal coupled through a first capacitor to the read element and an output terminal coupled through a second capacitor to a transmission line, wherein the sense amplifier is for amplifying the read signal.

FIG. 1C shows a disk drive read circuit according to an embodiment comprising a read element 2 for generating a read signal 4, and a sense amplifier 6 comprising an input terminal 8 coupled through a first capacitor 10A to the read element 2 and an output terminal 12 coupled through a second capacitor 10B to a transmission line 14, wherein the sense amplifier 6 is for amplifying the read signal 4.

FIG. 1A shows a disk drive according to an embodiment comprising the disk drive read circuit of FIG. 1C, wherein a slider 16 comprising the read element 2 is actuated over a disk 18 in order to read data recorded on the disk 18. The slider 16 is coupled to an actuator arm 20 through a suspension 22, wherein the actuator arm 20 is rotated about a pivot by a voice coil motor (VCM) 24 in order to actuate the slider 16 radially over the disk 18. The slider 16 is coupled to a preamplifier 26 through an interconnect 28 as shown in an embodiment in FIG. 1B, wherein the interconnect 28 comprises the transmission line 14. In one embodiment, the transmission line 14 comprises a trace of a flex circuit, and in one embodiment disclosed below, the disk drive read circuit couples the slider 16 to the preamp 26 through the flex circuit.

The slider 16 may be fabricated with any suitable read element 2, such as a magnetoresistive (MR) element which exhibits a varying resistance when subjected to the magnetic field emanating from the magnetic transitions recorded on the disk 18. The MR element is typically biased with a bias current such that the read signal 4 is represented as the change in voltage across the MR element due to the magnetic field of the disk 18.

Certain read elements, such as certain MR elements, may exhibit a high resistance R that may be significantly higher than the input impedance Z of the flex circuit and preamplifier 26. The large mismatch between R and Z may cause significant signal to noise (SNR) degradation since the read signal voltage at the input to the preamplifier 26 is reduced by a scaling factor of Z/(R+Z). In one embodiment, this SNR degradation is substantially avoided by closely coupling the sense amplifier 6 to the read element 2, such as by coupling the sense amplifier 6 to the slider 16, integrating the sense amplifier 6 with the slider 16, or integrating the sense amplifier 6 into the flex circuit near the slider 16. In an embodiment shown in FIG. 2, the input terminal 8 of the sense amplifier may be coupled to the read element 2 (through the first capacitor 10A) by a distance of not more than 2 millimeters, and in another embodiment, by a distance of not more than 4 millimeters. In one embodiment, the sense amplifier 6 has a high input impedance (Zin>R) which helps avoid the SNR loss due to the scaling factor Zin/(R+Zin). In addition, in one embodiment the sense amplifier 6 has a low output impedance Zout in order to minimize the scaling factor Zfp/(Zfp+Zout), where Zfp represents the input impedance of the flex circuit and the preamplifier 26.

Figure 2:
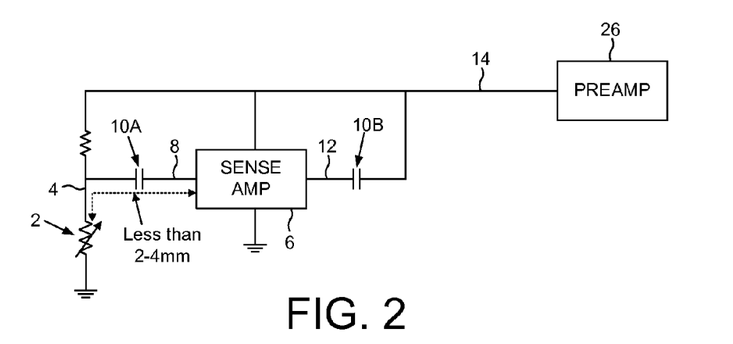
FIG. 2 shows an embodiment of the disk drive read circuit wherein the transmission line provides a bias signal to the read element and provides power to the sense amplifier.

In one embodiment, information in the read signal 4 is derived from the AC component rather than the DC component, and therefore the read signal 4 may be AC coupled to the input terminal 8 of the sense amplifier through the first capacitor 10A, and the output terminal 12 (representing the amplified read signal) may be AC coupled to the transmission line 14 through the second capacitor 10B. FIG. 2 shows an embodiment of the disk drive read circuit wherein the preamplifier 26 may apply a supply voltage to the transmission line 14 in order to provide power to the sense amplifier 6. Also in the embodiment of FIG. 2, the supply voltage is applied to the transmission line 14 in order to provide a bias signal (e.g., bias current) to the read element 2. Because the supply voltage applied to the transmission line 14 is a DC signal, it does not distort the information in the AC coupled read signal. In an embodiment shown in FIG. 3, the transmission line 14 may also be AC coupled to the preamplifier 26 in order to cancel the DC supply voltage applied to the transmission line 14 at the input to the preamplifier 26. Supplying power to the sense amplifier 6 as well as the bias signal to the read element 2 over the same transmission line as the read signal reduces the number of transmission lines required to couple the disk drive read circuit to the preamplifier 26.

Figure 3:
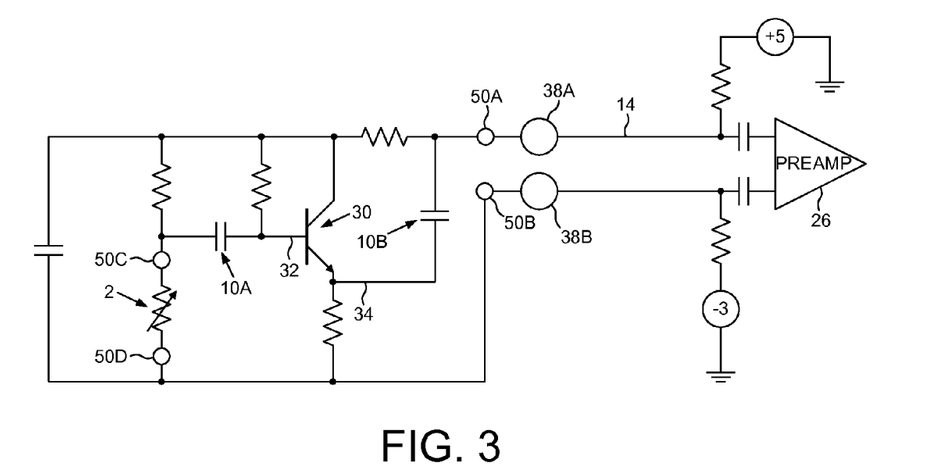
FIG. 3 shows an embodiment of the disk drive read circuit wherein the sense amplifier comprises an AC coupled emitter follower.

FIG. 3 shows an embodiment of the disk drive read circuit wherein the sense amplifier 6 of FIG. 1C comprises an AC coupled emitter follower (ACEF) including a transistor 30 having a base terminal 32 coupled to the read element 2 through the first capacitor 10A, and an emitter terminal 34 coupled to the transmission line 14 through the second capacitor 10B. Any suitable transistor 30 may be employed, such as a NESG2101m05-A NPN transistor having a unity current gain frequency $f_t$=17 GHz and a current gain of 130, wherein in one embodiment the collector area may be scaled down by a factor of 20. In addition, the second capacitor 10B may be sized to yield a −3 dB high pass at 20 MHz (single pole filter). The disk drive read circuit in the embodiment of FIG. 3 employs a +5V supply and a −3V supply to facilitate the NPN transistor 30. In another embodiment, the NPN transistor 30 shown in FIG. 3 may be replaced with a PNP transistor, wherein the +5V supply may be changed to a −3V supply, and the −3V supply removed, thereby reducing the power consumption of the disk drive read circuit.

Figure 4A:
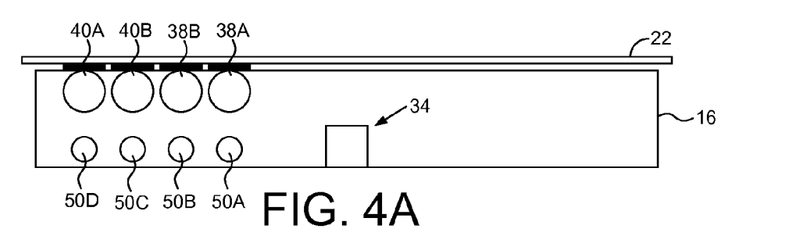
FIGS. 4A-4C show an embodiment wherein at least part of the disk drive read circuit is bonded to the slider.
Figure 4B:
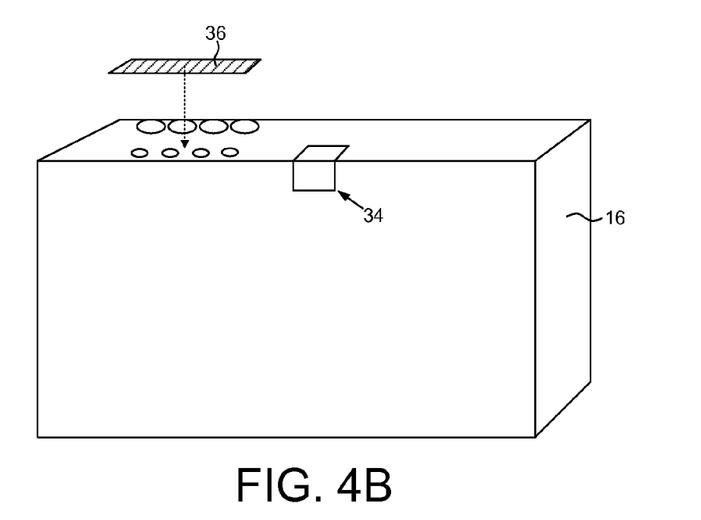
Figure 4C:
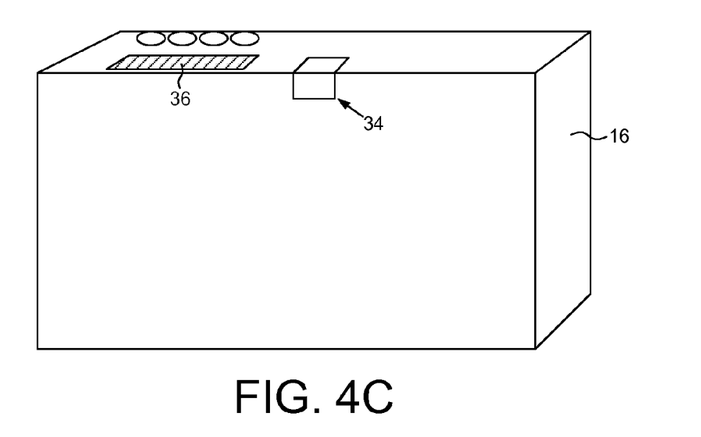

In one embodiment, a number of sliders may be fabricated on a first wafer and at least part of each disk drive read circuit may be fabricated on a second wafer, wherein the read circuits may then be bonded to sliders before or after slicing the first wafer. FIGS. 4A-4C illustrate an embodiment wherein a slider 16 may be fabricated on a first wafer comprising the components of a read/write transducer 34 (including the read element 2). At least part of a disk drive read circuit 36 (such as shown in FIG. 3) is fabricated on a second wafer and then bonded to the trailing edge of the slider 16. FIG. 4A shows bond pads 38A and 38B for the read signal and bond pads 40A and 40B for the write signal fabricated on the slider 16 for bonding to the suspension 22 in a conventional manner. FIG. 4A also shows bond pads 50A-50D for bonding the components of the disk drive read circuit 36 to the slider 16, thereby coupling the components of the disk drive read circuit 36 to the read element 2 such as shown in FIG. 3.

In one embodiment, the components of the disk drive read circuit 36 shown in FIG. 4B may be bonded to the slider 16 after fabricating the slider 16 on the first wafer but prior to slicing the first wafer. In this manner, the components of the disk drive read circuit 36 may help protect against damage to the read element 2 due to an electrostatic discharge (ESD) early in the fabrication process. That is, the components of the disk drive read circuit 36 may provide ESD protection as soon as the sliders have been fabricated on the first wafer, whereas conventionally ESD protection has been added to the slider 16 after slicing the first wafer, a process which may itself generate a damaging ESD.

Figure 5:
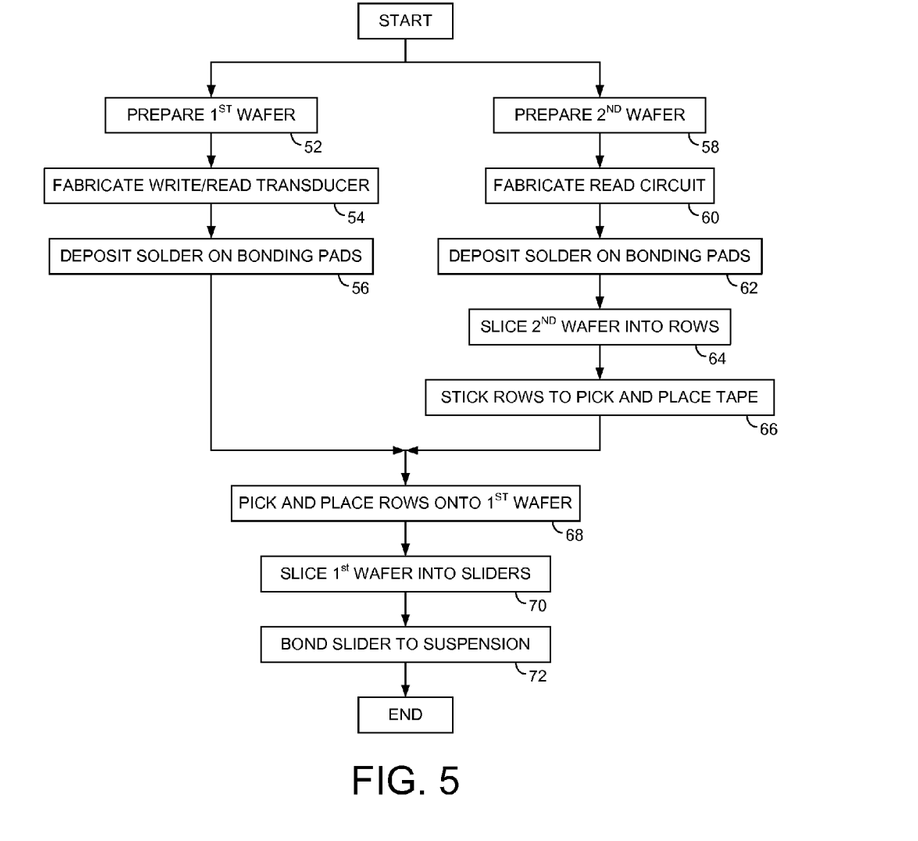
FIG. 5 is a flow diagram according to an embodiment wherein the read element is fabricated on a substrate of a first wafer, and the sense amplifier is coupled to the read element prior to slicing the first wafer.

This embodiment is illustrated by the flow diagram of FIG. 5 wherein the sliders are fabricated on a first wafer, and components of the disk drive read circuits are fabricated on a second wafer. When fabricating the sliders, the first wafer is prepared (block 52) and then the write/read transducer is fabricated using conventional techniques (block 54). Solder is then deposited on the bonding pads, including the bonding pads for the disk drive read circuit (block 56). When fabricating the components of the disk drive read circuits, the second wafer is prepared (block 58), and then the read circuit components are fabricated on the second wafer (block 60). Solder is deposited on the bonding pads (block 62), the second wafer is sliced into rows (block 64), and the rows are stuck to pick and place tape (block 66). Depending on the implementation, the first wafer may be processed at least partially concurrently with the second wafer or the first wafer and second wafer may be processed serially.

The rows of read circuits are then picked and placed onto the sliders of the first wafer (block 68). The first wafer is then sliced in a conventional manner (block 70), such as by slicing the wafer into rows, lapping the rows, and then slicing the rows into the sliders. A slider 16 is then bonded to a suspension 22 (block 72) as shown in FIG. 4A.

Figure 6:
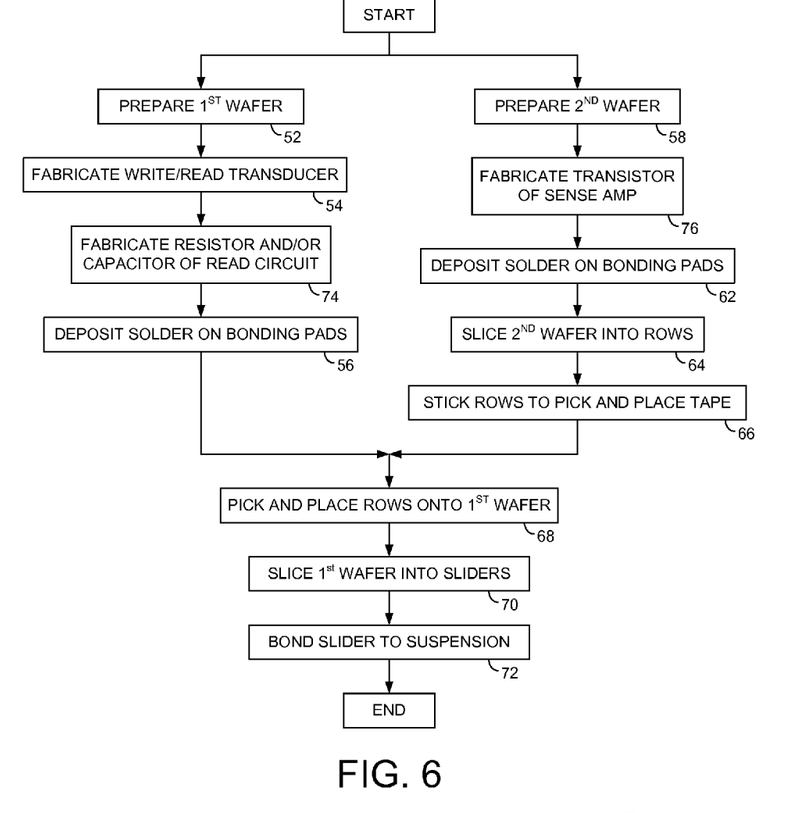
FIG. 6 is a flow diagram according to an embodiment wherein the slider and at least one of a resistor and/or a capacitor of the disk drive read circuit are fabricated on a first wafer, and a transistor of the sense amplifier is fabricated on a second wafer.

In one embodiment, the resistors, capacitors, and sense amplifier of the disk drive read circuit may be fabricated on the second wafer and then bonded to the slider. In an alternative embodiment, one or more components of the disk drive read circuit may be fabricated on the first wafer together with the sliders, and the remaining components of the disk drive read circuit fabricated on the second wafer. The flow diagram of FIG. 6 illustrates an example of this embodiment which is an extension of the flow diagram of FIG. 5. In this embodiment, at least one resistor and/or at least one capacitor (e.g., capacitor 10A or 10B) of the disk drive read circuit is fabricated on the first wafer (block 74), and at least the transistor of the sense amplifier is fabricated on the second wafer (block 76). In one embodiment, the components of the disk drive read circuit are fabricated on the second wafer using only three bonding pads for bonding the three terminals of the transistor to the slider fabricated on the first wafer.

The resistors of the disk drive read circuit may be fabricated on the first wafer through the deposition of thin films of resistive materials, such as NiCr, Ni—CrO2, Ni—ZrO2, etc., and the capacitors may be fabricated by depositing alternating layers of smooth conductors, such as Ta and insulating ceramic such as $SrTiO_3$, $Ta2O_5$, $SiO_2$, $Al_2O_3$. The use of a high dielectric constant material, such as $SrTiO_3$, may help minimize the required area, and thermal oxidation of the Ta may also be added to the insulating layers to provide insurance against voltage break down.

In one embodiment, the disk drive read circuit may be fabricated entirely on the first wafer together with the slider components assuming that a suitable fabrication process for the sense amplifier 6 are (or become) available. In this embodiment, the bonding pads 50A-50D on the slider 16 shown in FIGS. 3 and 4A would not be needed since the disk drive read circuit, including the read element 2, would be fabricated within the slider 16.

Figure 7:
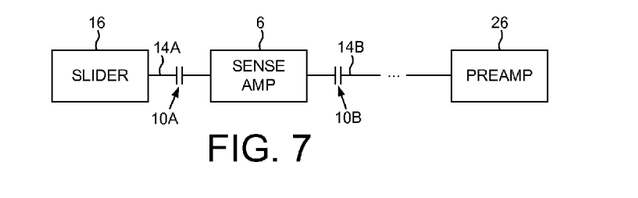
FIG. 7 shows an embodiment wherein the sense amplifier is AC coupled to a slider through a first flex circuit, and the sense amplifier is AC coupled to a preamplifier through a second flex circuit.

In one embodiment, components of the disk drive read circuit may be integrated into the flex circuit of the interconnect 28 shown in FIG. 1B rather than bonding the components to the slider 16. FIG. 7 illustrates this embodiment wherein the sense amplifier 6 is AC coupled to a slider 16 through a first flex circuit 14A, and the sense amplifier 6 is AC coupled to the preamplifier 26 through a second flex circuit 14B. In one embodiment, the sense amplifier 6 is AC coupled close to the slider 16 to minimize the SNR loss due to the above described scaling factor Z/(R+Z). The components of the disk drive read circuit may be integrated into the flex circuit of the interconnect 28 in any suitable manner, wherein in one embodiment the components may be implemented as a Flip-Chip that bridges a gap in the flex circuit near the slider 16.

The components of the disk drive read circuit may be bonded to the slider other than on the trailing edge as shown in FIGS. 4A-4C. For example, in one embodiment the components may be bonded to a top surface of the slider 16, and in another embodiment the components of the disk drive read circuit may be integrated with other components that are bonded to the slider. For example in one embodiment the disk drive may employ heat assisted magnetic recording (HAMR) wherein a laser (e.g., a laser diode) may be fabricated on a second wafer and then bonded to the slider (e.g., on the top surface). In this embodiment, the components of the disk drive read circuit may be fabricated on the second wafer together with the laser diode, and the resulting composite circuit bonded to the slider.

Figure 8:
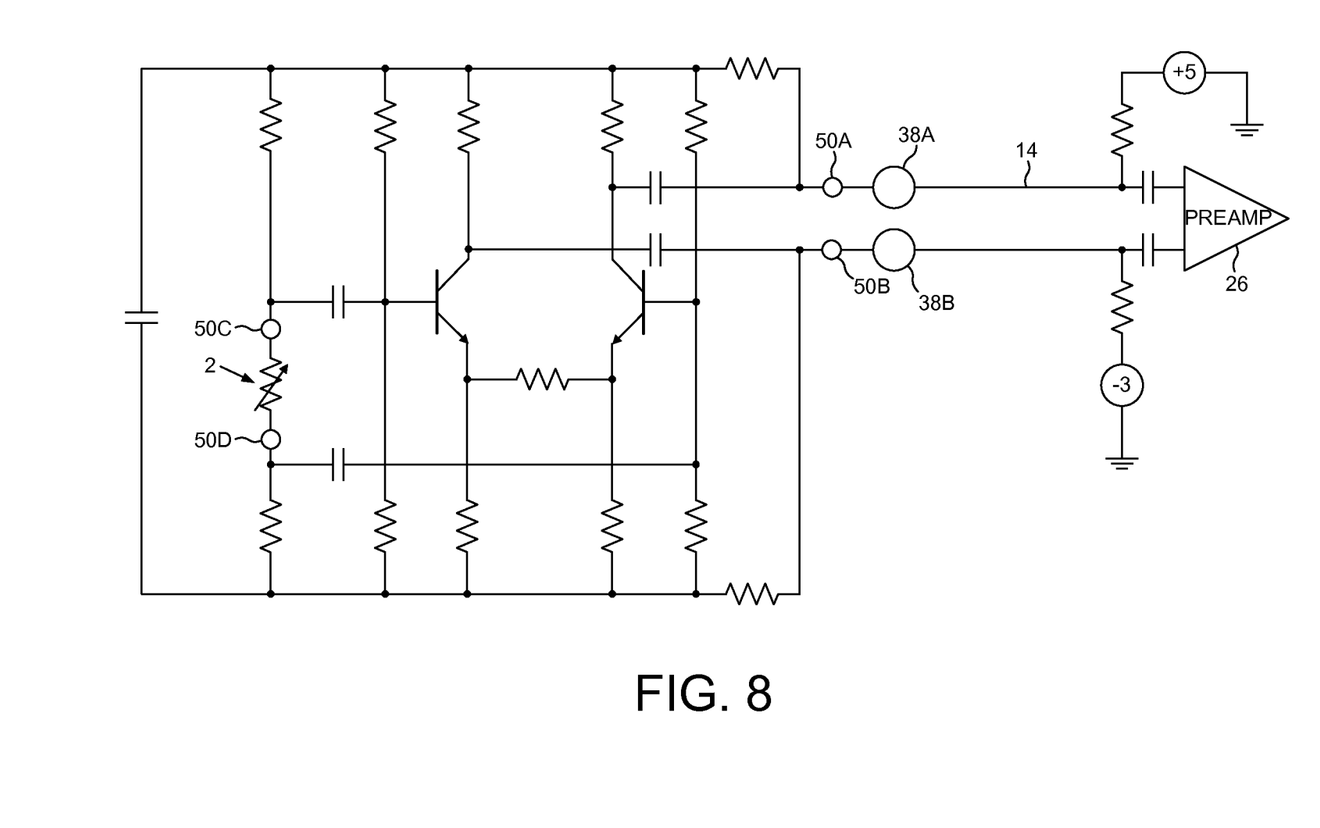
FIG. 8 shows an embodiment wherein the sense amplifier comprises an AC coupled differential amplifier.

Although the embodiment of FIG. 3 shows a sense amp 6 comprising an AC coupled emitter follower, any suitable sense amp 6 may be employed. FIG. 8 shows an embodiment of a sense amp 6 comprising an AC coupled differential amplifier. In one embodiment, the AC coupled differential amplifier may comprise a voltage gain of greater than one as compared to the AC coupled emitter follower of FIG. 3 which has a voltage gain of near unity. In one embodiment, employing a sense amp 6 having a voltage gain greater than one improves the SNR at the output of the preamplifier 26. In one embodiment, the −3v supply in FIG. 8 may be removed to reduce the power consumption of the disk drive read circuit.

What is claimed is:

1. A disk drive read circuit comprising:
   a read element for generating a read signal; and
   a sense amplifier comprising an input terminal coupled through a first capacitor to the read element and an output terminal coupled through a second capacitor to a first end of a transmission line, wherein:
   a second end of the transmission line is coupled to a preamplifier; and
   the sense amplifier is for amplifying the read signal,
   wherein the transmission line provides at least one of a bias signal to the read element and power to the sense amplifier.

2. The disk drive read circuit as recited in claim 1, wherein the input terminal of the sense amplifier is coupled through the first capacitor to the read element proximate the read element.

3. The disk drive read circuit as recited in claim 2, wherein the input terminal of the sense amplifier is coupled through the first capacitor to the read element by a distance of not more than 2 millimeters.

4. The disk drive read circuit as recited in claim 2, wherein the input terminal of the sense amplifier is coupled through the first capacitor to the read element by a distance of not more than 4 millimeters.

5. The disk drive read circuit as recited in claim 1, wherein the second end of the transmission line is coupled to a bond pad of a slider, and the bond pad of the slider is coupled to a flex circuit.

6. The disk drive read circuit as recited in claim 5, wherein the sense amplifier comprises at least one transistor and at least one resistor.

7. The disk drive read circuit as recited in claim 6, wherein:
   the read element is fabricated on a substrate of a first wafer; and
   at least the resistor of the sense amplifier is fabricated on the substrate of the first wafer.

8. The disk drive read circuit as recited in claim 1, wherein:
   the read element is fabricated on a substrate of a first wafer; and
   at least one of the first and second capacitors is fabricated on the substrate of the first wafer.

9. The disk drive read circuit as recited in claim 1, wherein:
   the sense amplifier is coupled to a slider through a first flex circuit, wherein the slider comprises the read element; and
   the sense amplifier is coupled to a preamplifier through a second flex circuit.

10. The disk drive read circuit as recited in claim 1, wherein the sense amplifier comprises an emitter follower.

11. The disk drive read circuit as recited in claim 1, wherein the sense amplifier comprises a differential amplifier.

12. The disk drive read circuit as recited in claim 11, wherein a voltage gain of the differential amplifier is greater than one.

13. A method of manufacturing a disk drive read circuit comprising a read element for generating a read signal, the method comprising:
    coupling an input terminal of a sense amplifier through a first capacitor to the read element; and
    coupling an output terminal of the sense amplifier through a second capacitor to a first end of a transmission line, wherein:
    a second end of the transmission line is coupled to a preamplifier; and
    the sense amplifier is for amplifying the read signal,
    wherein the transmission line provides at least one of a bias signal to the read element and power to the sense amplifier.

14. The method as recited in claim 13, wherein the input terminal of the sense amplifier is coupled through the first capacitor to the read element proximate the read element.

15. The method as recited in claim 14, wherein the input terminal of the sense amplifier is coupled through the first capacitor to the read element by a distance of not more than 2 millimeters.

16. The method as recited in claim 14, wherein the input terminal of the sense amplifier is coupled through the first capacitor to the read element by a distance of not more than 4 millimeters.

17. The method as recited in claim 13, wherein the second end of the transmission line is coupled to a bond pad of a slider, and the bond pad of the slider is coupled to a flex circuit.

18. The method as recited in claim 17, wherein the sense amplifier comprises at least one transistor and at least one resistor.

19. The method as recited in claim 18, further comprising:
    fabricating the read element on a substrate of a first wafer; and
    coupling the sense amplifier to the read element prior to slicing the first wafer.

20. The method as recited in claim 19, further comprising:
    fabricating at least the transistor of the sense amplifier on a substrate of a second wafer; and
    bonding the transistor to the first wafer prior to slicing the first wafer.

21. The method as recited in claim 18, further comprising:
    fabricating the read element on a substrate of a first wafer; and
    fabricating at least the resistor of the sense amplifier on the substrate of the first wafer.

22. The method as recited in claim 18, further comprising:
    fabricating the read element on a substrate of a first wafer; and
    fabricating at least one of the first and second capacitors on the substrate of the first wafer.

23. The method as recited in claim 13, further comprising:
coupling a slider comprising the read element to the sense amplifier through a first flex circuit; and
coupling the sense amplifier to a preamplifier through a second flex circuit.

24. The method as recited in claim 13, wherein the sense amplifier comprises an emitter follower.

25. The method as recited in claim 17, wherein the sense amplifier comprises a differential amplifier.

26. The method as recited in claim 25, wherein a voltage gain of the differential amplifier is greater than one.

27. A disk drive read circuit comprising:
a read element for generating a read signal; and
a sense amplifier comprising an input terminal coupled through a first capacitor to the read element and an output terminal coupled through a second capacitor to a first end of a transmission line, wherein:
a second end of the transmission line is coupled to a preamplifier;
the sense amplifier is for amplifying the read signal; and
the second end of the transmission line is coupled to a bond pad of a slider, and the bond pad of the slider is coupled to a flex circuit.

28. A disk drive read circuit comprising:
a read element for generating a read signal; and
a sense amplifier comprising an input terminal coupled through a first capacitor to the read element and an output terminal coupled through a second capacitor to a first end of a transmission line, wherein:
a second end of the transmission line is coupled to a preamplifier;
the sense amplifier is for amplifying the read signal;
the sense amplifier is coupled to a slider through a first flex circuit, wherein the slider comprises the read element; and
the sense amplifier is coupled to a preamplifier through a second flex circuit.

29. A method of manufacturing a disk drive read circuit comprising a read element for generating a read signal, the method comprising:
coupling an input terminal of a sense amplifier through a first capacitor to the read element; and
coupling an output terminal of the sense amplifier through a second capacitor to a first end of a transmission line, wherein:
a second end of the transmission line is coupled to a preamplifier;
the sense amplifier is for amplifying the read signal; and
the second end of the transmission line is coupled to a bond pad of a slider, and the bond pad of the slider is coupled to a flex circuit.

30. A method of manufacturing a disk drive read circuit comprising a read element for generating a read signal, the method comprising:
coupling an input terminal of a sense amplifier through a first capacitor to the read element; and
coupling an output terminal of the sense amplifier through a second capacitor to a first end of a transmission line, wherein:
a second end of the transmission line is coupled to a preamplifier; and
the sense amplifier is for amplifying the read signal,
coupling a slider comprising the read element to the sense amplifier through a first flex circuit; and
coupling the sense amplifier to a preamplifier through a second flex circuit.

* * * * *